March 29, 1932. F. R. SCHMITT 1,851,295
UNDERFOLD WRAPPING MACHINE
Filed Jan. 23, 1929 7 Sheets-Sheet 1
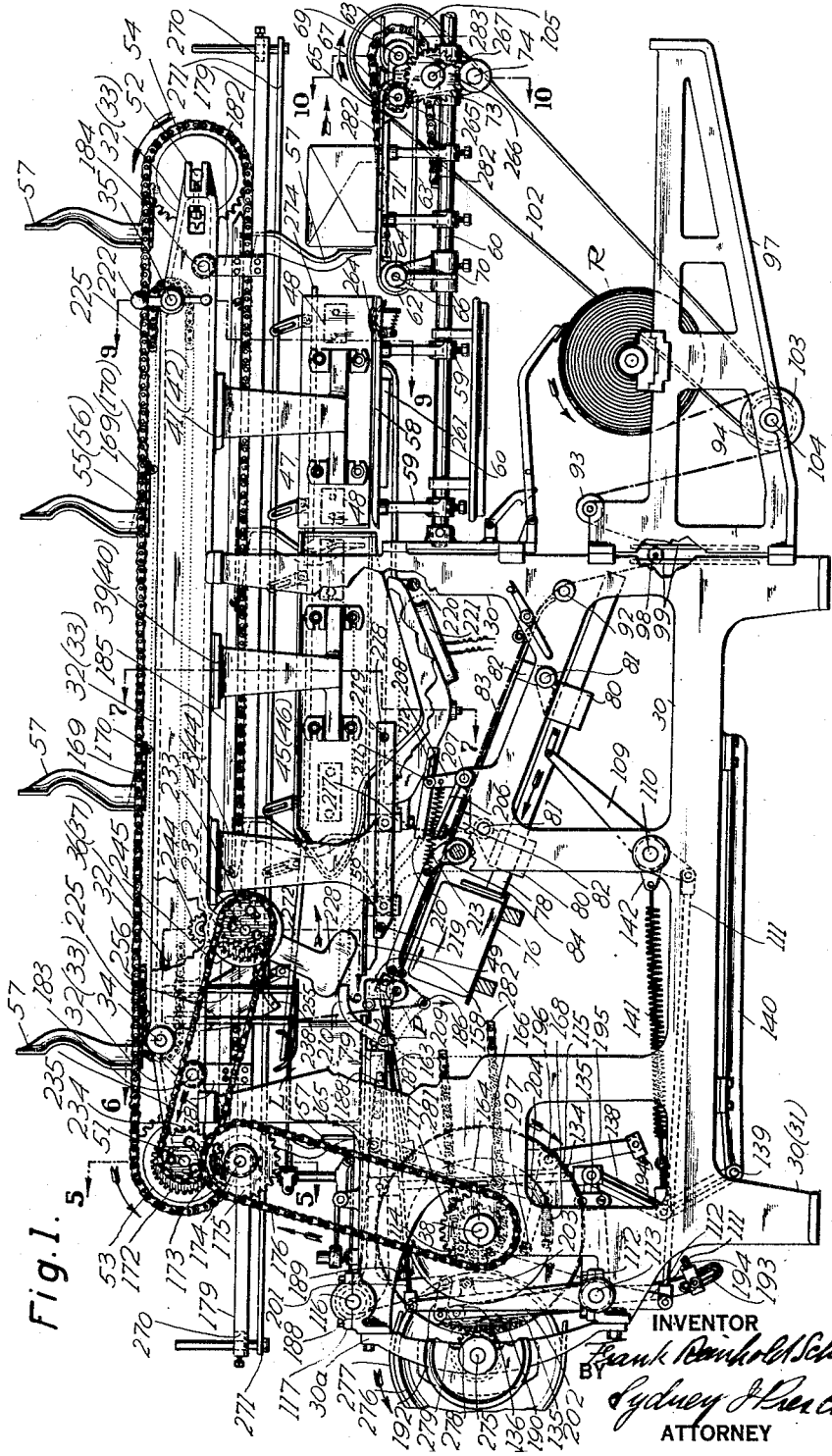
INVENTOR
Frank Reinhold Schmitt
BY Sydney J. Prescott
ATTORNEY March 29, 1932.  F. R. SCHMITT  1,851,295
UNDERFOLD WRAPPING MACHINE
Filed Jan. 23, 1929  7 Sheets-Sheet 2
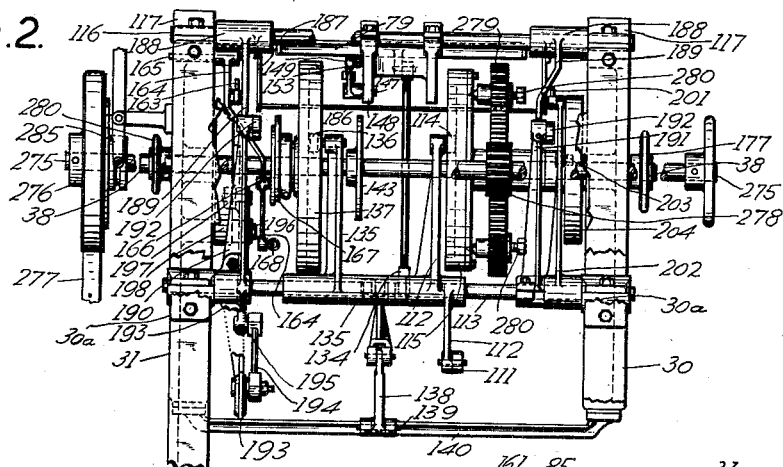
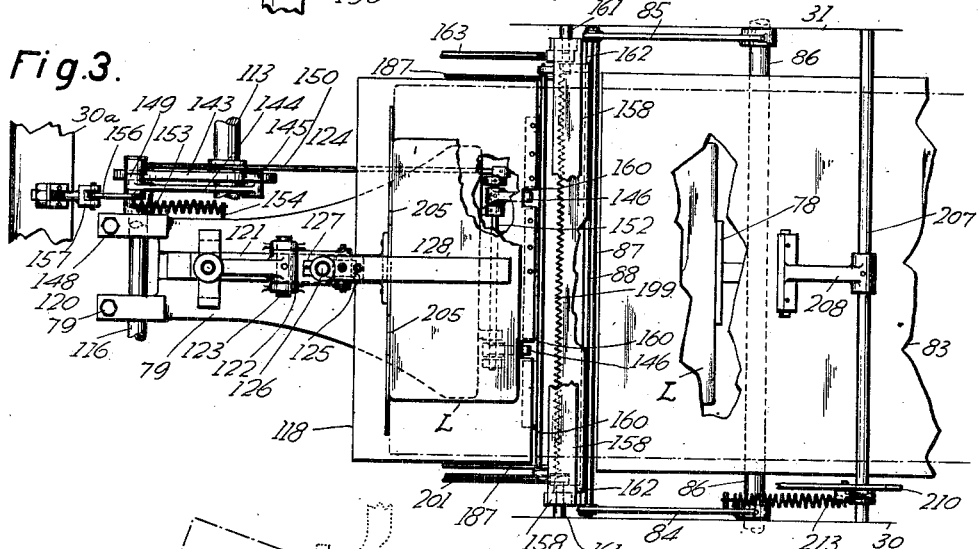
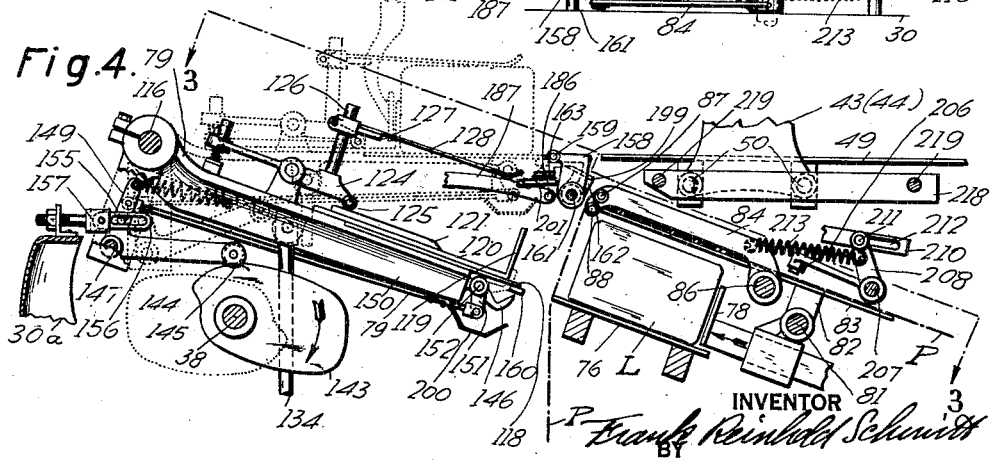
INVENTOR
Frank Reinhold Schmitt
BY Sydney J. Prescott
ATTORNEY March 29, 1932.  F. R. SCHMITT  1,851,295
UNDERFOLD WRAPPING MACHINE
Filed Jan. 23, 1929  7 Sheets-Sheet 3
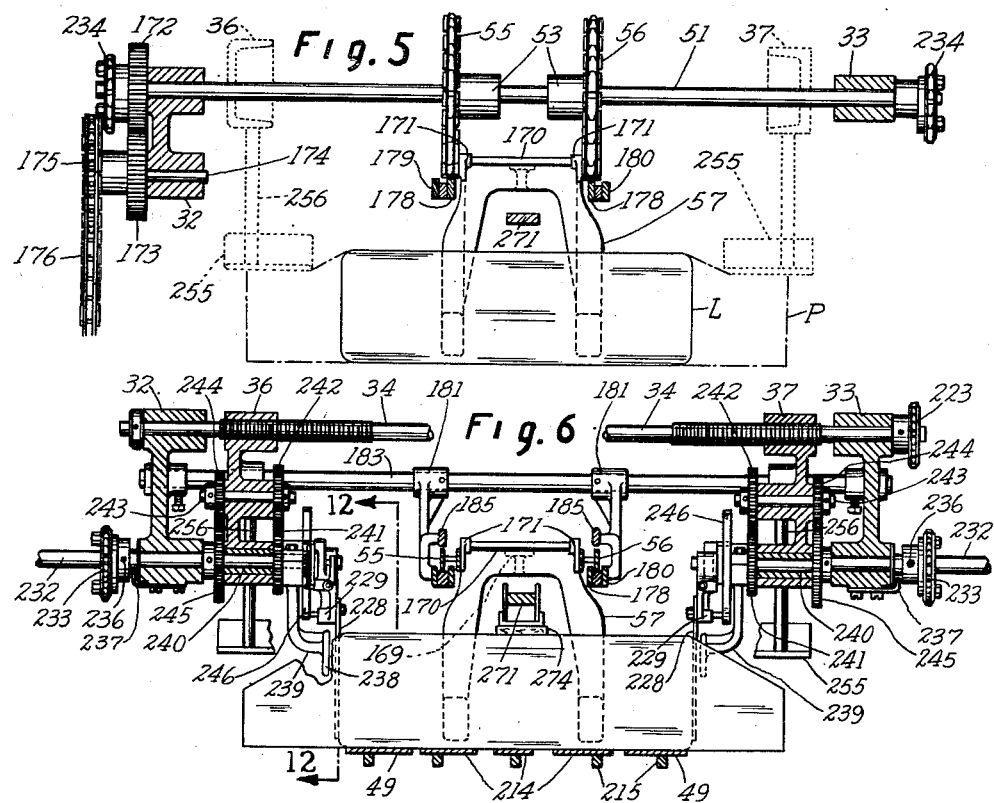
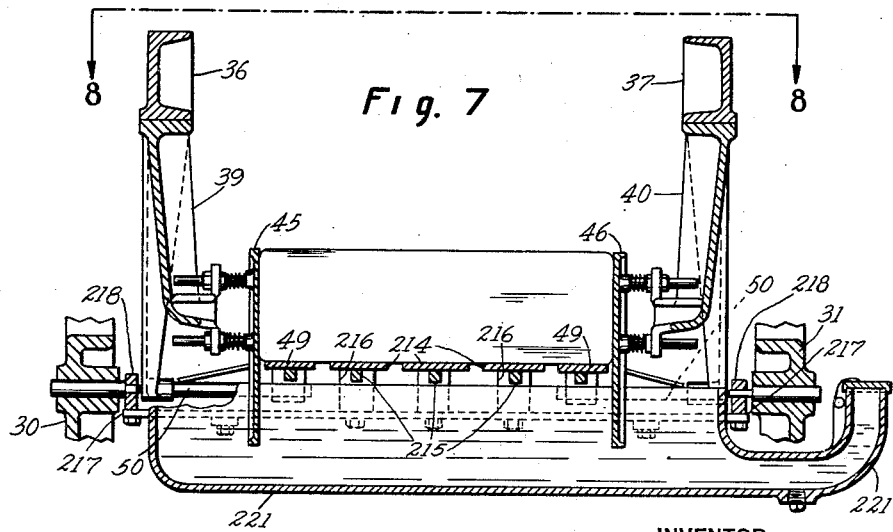
INVENTOR
Frank Reinhold Schmitt
BY
Sydney J. Prescott
ATTORNEY March 29, 1932.  F. R. SCHMITT  1,851,295
UNDERFOLD WRAPPING MACHINE
Filed Jan. 23, 1929   7 Sheets-Sheet 4

INVENTOR
Frank Reinhold Schmitt
BY
Sydney J. Prescott
ATTORNEY

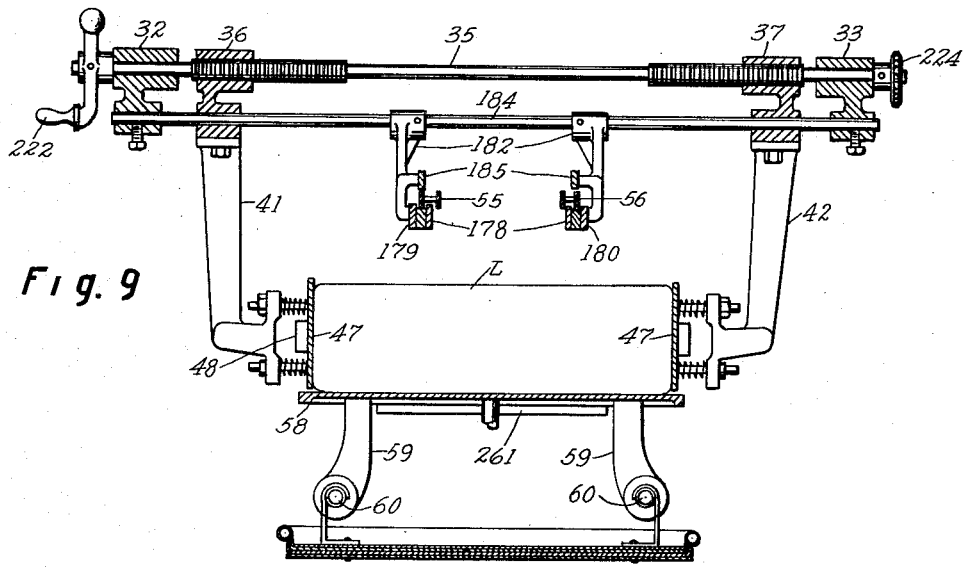

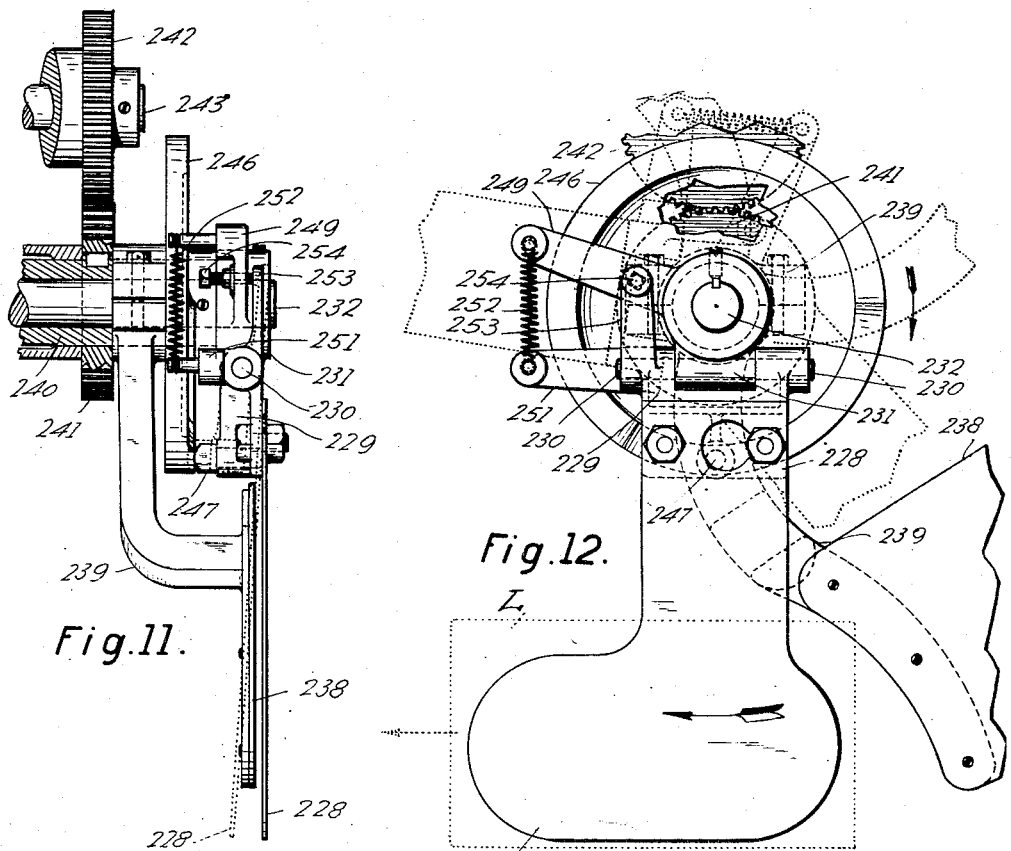

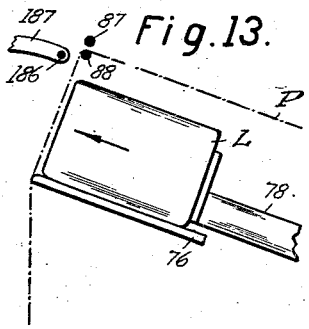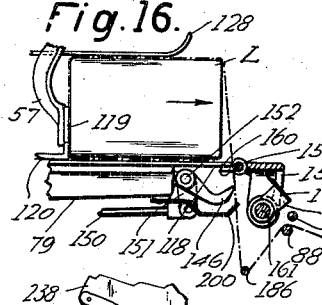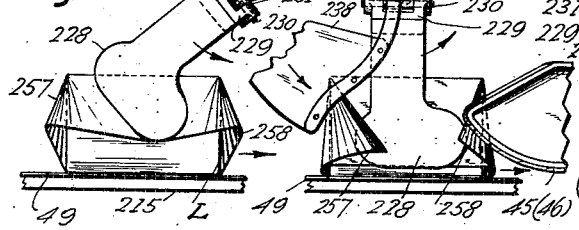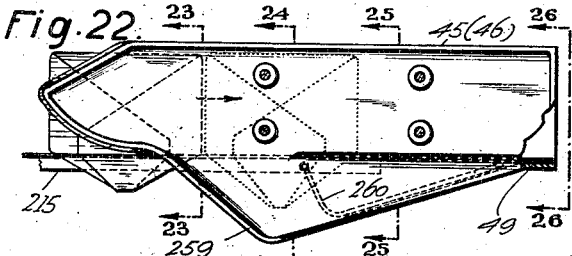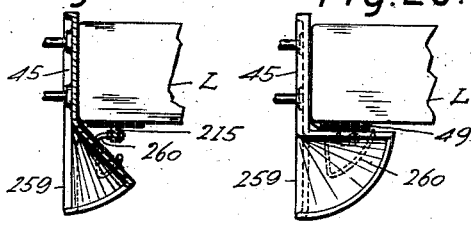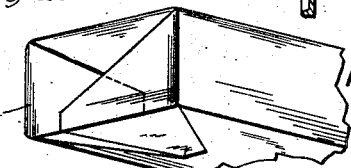

Patented Mar. 29, 1932

1,851,295

UNITED STATES PATENT OFFICE

FRANK REINHOLD SCHMITT, OF BROOKLYN, NEW YORK, ASSIGNOR TO AMERICAN MACHINE & FOUNDRY COMPANY, A CORPORATION OF NEW JERSEY

UNDERFOLD WRAPPING MACHINE

Application filed January 23, 1929. Serial No. 334,479.

This invention relates to improvements in wrapping machines, particularly machines for wrapping and sealing articles which may differ considerably in size and which may be of somewhat irregular contour such, for example, as loaves of bread, etc. The invention has for one of its purposes that of improving the folding of overhanging wrapping material on the ends or sides of partially wrapped or enfolded articles.

One important object of the present invention is to provide an efficient machine of high capacity for wrapping the final end flap or bottom side of the wrapping material overhanging the ends of partially wrapped articles underneath and against the bottom of the article instead of folding this material against the end of the article, as has commonly been done hitherto. This under folding has been found desirable for some purposes such, for instance, as closely wrapping articles having rounded or somewhat irregular shaped ends, and for making a neater package with less overlapping material at the ends. Such packages also have the advantage that the sealing of the ends is simplified. Other objects of the invention are to provide efficient folding means for machines of this general type which will fold wrapping material over the ends of partially wrapped articles rapidly and neatly. Another object is to provide a machine which will perform this folding while the articles travel continuously in one direction, thus avoiding delay and complication due to intermittent motion or changing the direction of movement of the article during enfolding.

A further object is to provide convenient means for simultaneously adjusting several parts of the machine to adapt the same to wrap articles of different dimensions. Another object is to improve the sealing means. Still another object is to provide improved conveyor means which will avoid scraping of the waxed, or other type of wrapper, when the means used to push the articles through the machine are disengaged from the articles. Another object is to provide an improved stationary folder for end folding wrapping material at the ends of partially wrapped articles.

With these and other objects not specifically mentioned in view, the invention consists in certain constructions and combinations which will be hereinafter fully described and then specifically set forth in the claims hereunto appended.

In the accompanying drawings which form a part of this specification and in which like characters of reference indicate the same or like parts:

Fig. 1 is a side elevation of a bread wrapping machine embodying the invention, the loaves passing from left to right during end folding;

Fig. 2 is a front elevation, partly broken away, of the machine as seen from the left hand end of Fig. 1;

Fig. 3 is a detail plan view of the part of the machine shown in Fig. 1;

Fig. 4 is a side elevation, partly in section, of the parts shown in Fig. 3;

Fig. 5 is a detail cross section on line 5—5 of Fig. 1;

Fig. 6 is a cross section on the line 6—6 of Fig. 1;

Fig. 7 is a cross section on the line 7—7 of Fig. 1;

Fig. 9 is a cross section on the line 9—9 of Fig. 1;

Fig. 11 is an enlarged side elevation of the flying folders;

Fig. 12 is a sectional front elevation of the flying folders shown in Fig. 11 as seen on the line 12—12 of Fig. 6;

Figs. 13 to 22 are detailed end elevations on an enlarged scale showing the successive steps of wrapping and folding the wrapper about a loaf of bread, as performed by the improved machine;

Figs. 23 to 26 are detail sections at different points along the length of the stationary folders shown in Fig. 22;

Fig. 27 is a perspective view of the completed package.

Figure 8:
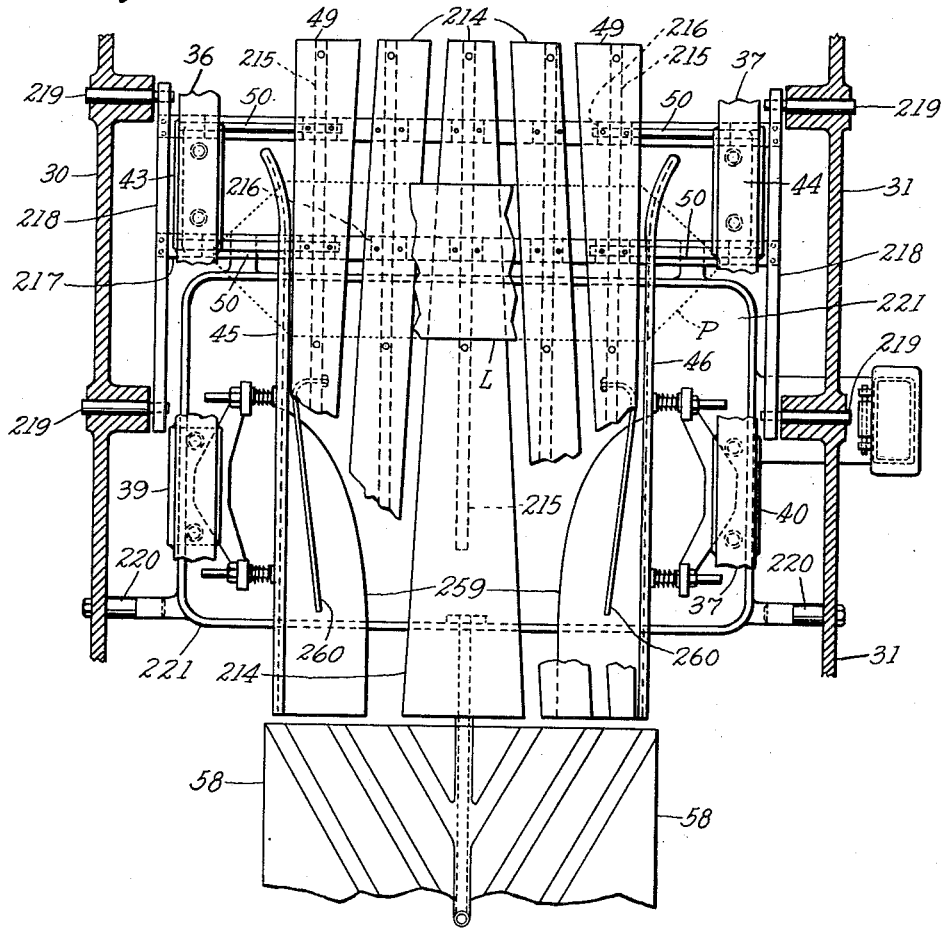
Fig. 8 is a plan view of the mechanism shown in Fig. 7 taken on the line 8—8 thereof.
Figure 10:
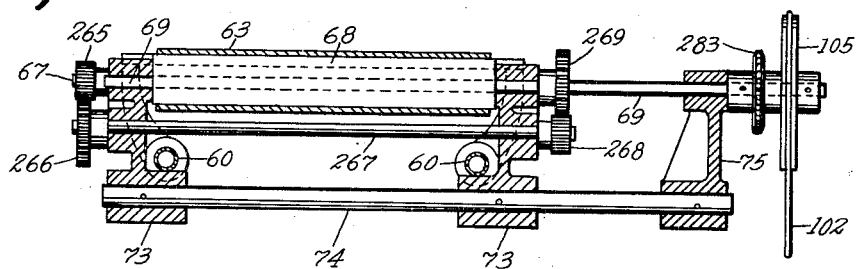
Fig. 10 is a cross section on the line 10—10 of Fig. 1.

In carrying the invention into effect, there is provided mechanism for folding a wrapper circumferentially about an article and overhanging the ends thereof, mechanism for forwarding the enfolded articles, flying folders successively engaging the top and rear sides of the overhanging material to fold said sides on the ends of the article, operating means for said folders, and stationary means for folding the front sides of the overhanging material on the ends of the article and for folding the lower sides of said material on the bottom of the article. In the best constructions, the said forwarding mechanism operates to continuously forward the enfolded articles in one direction, thus avoiding complication and delay due to intermittent motion or changes of direction. Preferably, the said operating means includes means for producing differential movement of said folders to cause one folder to pass the other folder while said folders are operating on the material. In the best constructions, the stationary folding means comprises walls having converging folding surfaces extending inwardly to a position adjacent the ends of the article to fold said front sides against the end of the article, thence downwardly below said article to fold the bottom sides down, thence inwardly and upwardly adjacent the bottom of the article to fold the bottom side of the overhanging material against the bottom of the article. In the preferred form, means are provided for simultaneously adjusting the folders, operating means therefor, and stationary folding means to fit articles of different sizes.

While for purposes of illustration the invention has been shown applied to a bread wrapping machine of the type disclosed in the U. S. patent to H. Y. Armstrong, patented April 26, 1927, 1,626,379, these various means and parts may be widely varied in construction within the scope of the claims, the machine illustrated being one of many possible concrete embodiments of the same. The invention, therefore, is not to be restricted to the specific construction shown and described.

Frame and conveyor system

Referring to Fig. 1 of the drawings, a suitable frame work for supporting the several parts is provided, including the lower side frames 30 and 31, tie frame 30a, and upper side frames 32 and 33 connected by cross rods 34 and 35, on which rods are adjustably mounted the longitudinally extending frame members 36 and 37. Frames 30 and 31 carry a cam and drive shaft 38. Pairs of brackets 39 and 40, 41 and 42, and 43 and 44 are fastened to the under side of frame members 36 and 37.

Brackets 39 and 40 carry stationary folding walls 45 and 46, brackets 41 and 42 carry the sidewalls 47 and their associated heaters 48, and brackets 43 and 44 carry the supporting plates 49, on the upper surface of which the packages are pushed through the machine. These bottom plates are adjustably mounted on the cross rods 50. The frames 32 and 33 support at their opposite ends the shafts 51 and 52 respectively, which carry pairs of sprockets 53 and 54 over which run the chains 55 and 56, on which the pusher members 57 for forwarding the loaves are mounted.

The heated plate 58, over which the loaves are pushed by members 57 and which serves to seal the bottom of the wrapped loaves, is adjustably supported by uprights 59 on cylindrical rails 60 extending lengthwise of the machine.

Delivery belts 62 and 63 receive the loaves from the plate 58, the former belt running over pulleys 64 and 65 on shafts 66 and 67 respectively, and the latter belt running over pulley 68 on shaft 69 and an outward pulley not shown. The shaft 66 is journalled in bearing 70 supported from the rail 60. Shafts 67 and 69 are supported from the rail 60 by suitable brackets 73 which are connected by the cross rod 74, one end of which projects beyond one of the brackets to provide a bearing 75 for the projecting end of the shaft 69. A plate 71 carried by uprights on the rails 60 supports the upper loop of the belt 62.

Side wrapping mechanism

Referring to Fig. 4 of the drawings, the loaves L to be wrapped are received on an inclined plate 76 from a suitable feeding chute, not shown, and each loaf is carried by suitable conveyor means, not shown, to a position between the plunger 78 and the pivoted transfer member 79, when the latter is in its lower inclined position.

The plunger 78 is guided in brackets 80 attached to shafts 81 carried by the frames 30 and 31. These shafts also carry blocks 82 to which a paper supporting plate 83 is attached. A pair of stationary arms 84, 85 are mounted on a supporting shaft 86 carried by the frames 30 and 31 and these arms carry two cross rods 87 and 88, between which a free end of a web P of wrapping material is fed until a sufficient length is supplied for surrounding the loaf.

The web of wrapping material is led over shaft 92 loosely mounted in the frames 30 and 31 (Fig. 1) from the rollers 93 and 94, after having been drawn from the reel R. Between the shaft 92 and the roller 93, a roller 98 guided between rails 99 rests upon the paper web and takes up any slack. The web is fed by driven roller 94 by means of a pulley 103 on the roller shaft 104 connected by a belt 102 with pulley 105 on the shaft 69. This shaft 69 is driven in turn by shaft 38 through sprockets 281 and 283 and chain 282. The plunger 78 is operated by a crank lever 109 on a crank shaft 110 mounted in the frames 30 and 31. This crank shaft is oscillated by the rod 111 connected with a cam lever 112 pivoted at 113 and carrying a cam roller 114 in engagement with a cam 115 on the shaft 38.

The transfer member 79 (Figs. 3 and 4) swings on a shaft 116 to which it is clamped, which shaft is supported at either end by suitable bearings 117 carried by the frames 30 and 31. This transfer member includes a flat supporting plate 118 on which is slidably mounted a tension plate 119 positioned to resist the oncoming loaf, which plate is attached to a slide 120 carrying the cam rail 121. Bearings 122 and stud 123 carrying the hinged block 124 having a roller 125 resting on the rail 121. A post 126 attached to the block 124 has an adjustable collar 127 carrying the flat spring 128 for pressing the wrapper against the upper surface of the loaf. The block 124 is spring pressed to urge the spring 128 against the loaf as far as permitted by the cam rail 121.

The transfer member 79 is oscillated between the two positions shown in full lines and in dotted lines in Fig. 4 by means of rod 134 (Figs. 1 and 2) connected to the horizontal arm of a bell crank lever 135 pivoted on the shaft 113 and provided on its vertical arm with a cam roller 136 engaging a cam 137 on the shaft 38. The horizontal arm of the bell crank lever 135 is connected with a toggle joint 138 hinged at 139 to a bracket 140 supported by the frame 30, the toggle joint being urged toward an extended position by the spring 141 anchored at 142 on shaft 110 and serving to balance the weight of the transfer 79.

In the operation of the machine, starting with the loaf L in front of the plunger 78 and the transfer in its lower position in alignment with said plunger, the plunger is operated to forward a loaf into the end of the web P of wrapping material and on to the transfer table 79. The loaf is thus pushed between the bottom plate 118 of the transfer and the spring 128 (Figs. 3, 4, 13 and 14), which at that moment is lifted by the action of the cam rail 121. The tension plate 119, as it is pushed back by the loaf, operates the cam rail 121 to lower the spring 128 on to the top of the loaf, and thus presses the wrapping material against the same. Thus the folds 89, 90 and 91 of the wrapper as shown in Fig. 14 are wrapped about the three sides of the loaf.

The plunger 78 then returns to its starting position, while the cam 143 on the shaft 38 causes the cam lever 144 through roller 145 to descend and reach its lowermost position, to raise the fingers 146 into slots in the plate 118 in order to prevent the loaf from sliding back. Cam lever 144 is pivoted at 147 on the bracket 148 depending from the transfer 79. An arm 149 of the lever 144 is connected by a rod 150 with a lever 151 on shaft 152 in order to operate the fingers 146 mounted on said shaft. The roller 145 of cam lever 144 is kept on the cam by spring 153 attached to the arm 149 and the post 154 fixed to the transfer 79. A pin 155 on the arm 149 is guided in the slot of a loosely mounted link 156 held by a block 157 fastened to an angle piece on the tie member 30a to limit the motion of fingers 146 and to withdraw them from the path of the loaf, when the transfer 79 is in its rest position, as shown in dotted line in Fig. 4.

The roller 159 on frame 158 is, in the meantime, clamped, against the rubber strip 160 fastened at the front edge of the plate 118, when the transfer 79 is swung to its upper position, the frame 158 carrying this roller being swingably mounted for this purpose on studs 161 carried by the frames 30 and 31. On the same studs also are pivotally mounted the knife blocks 162. The frame 158 is operated by a rod 163 driven from cam 167 on shaft 38 by lever 164 pivoted at 165 on the side frame 31 and having a roller 166 held against the cam by a spring 168.

In the upper position of the transfer 79, the loaf is in the path of the pusher members 57 which engage the tension plate 119 and thereby push the loaf off the transfer and return said tension plate to its original position. At the same time, the transfer member begins to descend, pulling the tension plate 119 from the front of the pusher member, which continues to push the loaf along the support 49.

The pusher members 57 are secured to the chains 55, 56 by means of tails 169 on rods 170 in brackets 171 fastened to the chains. The chains are continuously driven by means of spur gear 172 on the shaft 51, which gear meshes with another gear 173 on stud 174 supported on the frame 32 (Fig. 5). There is also mounted on this stud a sprocket 175 connected by a chain 176 and sprocket 177 to the shaft 38. To support the lower loops of chains 55 and 56, rails 178 are provided attached to bars 179 and 180 held by suitable brackets 181, 182 on the cross rods 183 and 184. These rods are mounted on the frames 32 and 33 and project through the frames 36 and 37, without hindering transverse movement of the latter frames. The chains are also provided with an upper guard 185 supported by the brackets 181 and 182.

While the transfer 79 is dwelling in its upper position, the paper is pulled off the reel by rod 186, which slowly swings down a predetermined distance. During this downward swing, the paper is clamped against the rubber strip 160 and is held firmly against the loaf by the spring 128, thus insuring taut wrapping of the package. The rod 186 is supported by two bars 187 (Figs. 1 and 2) fastened to arms 188 of bell crank levers pivoted on the shaft 116, the other arms 189 of the bell crank levers being connected with levers 190 and 191 on the shaft 113 by links 192. The lever 190 is provided with an arm 193 which is linked by a rod 194 with the bell crank lever 195 pivoted at 196, which lever is actuated through its roller 197 by the cam 198 on the shaft 38.

When the loaf is in the position shown in Fig. 17, the knife 199 cooperates with the ledger plate 200 to cut the web P and the clamp roller 159 releases the web. Blocks 162 carrying the knife are operated through link 201 actuated by cam lever 202 pivoted on the shaft 113 and having a roller 203 engaging a cam 204 on the shaft 38.

While the web is being cut, the paper or other wrapping material resting on the supporting plate 83 is pressed against said plate by lever 206; likewise during the time in which the rod 186 transfers the free end of the web to the position shown in Fig. 18. The lever 206 is mounted on a shaft 207. The lever 208 on the shaft 207 is connected with a block 209 on the link 201 by means of a link 210. A pin 211 on the lever 208 projects into a slot 212 of the link 210, while a spring 213 connected to the arm 84 operates to pull the clamp lever 206 toward the paper supporting plate 83 to clamp the paper as the knife is moved into cutting position.

The loaf L is then pushed on to the folding table or support formed of adjustable bottom plates 49 and stationary plates 214 (Figs. 7 and 8). The plates 214 are attached to bars 215 on blocks 216 fastened to cross members 217 carried on supports 218 secured by stubs 219 to the frames 30 and 31, which also by securing means 220 support the wax receptacle 221.

When small loaves are to be wrapped, the two outer plates 214 are removed and the adjustable plates 49 are moved towards the middle of the path of forwarding.

In order to conveniently and simultaneously make the several adjustments necessary in adapting the machine to wrap smaller loaves, a hand crank 222 is provided on shaft 35 which, together with shaft 34, by means of right and left hand threads, carries the frames 36 and 37, which in turn carry the brackets 43 and 44 supporting the plates 49 as hereinbefore described. Thus operation of the hand lever will simultaneously adjust the plates 49 toward or away from each other. Shafts 34 and 35 are connected by chain 225 and sprockets 223 and 224. Movement of frames 36 and 37 by hand lever 222 will also adjust brackets 39—40 and 41—42, thereby in turn adjusting the folding walls 45 and 46 and the heated sidewalls 47 resiliently carried respectively by said brackets, for different size loaves.

End folding

The loaf is now at the front end of the folding table 49, partially wrapped by or enfolded by a wrapper extending circumferentially about the loaf and overhanging the ends thereof at either side of the path of movement of the loaf as it is forwarded by one of the pushers 57.

After the loaf has been forwarded on to the front end of the folding table 49, the top sides of the wrapper material overhanging each end of the package are folded by flying folders 228. These top side folders are in the form of thin plates or blades of the shape shown in Fig. 11, and are detachably mounted on brackets 229 hinged by means of the studs 230 to brackets 231 carried by shafts 232 located in suitable bearings in the frames 32, 36 and 33, 37. They are made detachable so that different size folders may be provided for wrapping different size articles. As will be seen from Fig. 6, rotation of the shafts 232 will revolve the folders 228 in planes parallel to and adjacent the path of the ends of the articles.

The operating means for these folders 228 comprise the shafts 232 on which are slidably mounted eccentric driven sprockets 233 connected with slidably mounted eccentric driving sprockets 234 on shaft 51, by chains 235. The projecting ends of the shafts 232 are provided with slots, with which pins 236 of sprockets 233 make driving engagement without preventing axial movement of the sprockets.

When frames 36 and 37 are adjusted by the hand lever 222, the sprockets 233 are maintained in fixed position despite movement of the shafts 232, by angle pieces 237 entering recesses in the hubs of the sprockets 233. The revolving top side folders 228 and a pair of rear side folders 238 likewise supported from frames 36 and 37, are also moved toward or away from each other with movement of the frames 36 and 37 to fit different size loaves.

The flying folders 238 for folding the rear side of the overhanging wrapping material are of generally flag shaped contour with a slightly concave leading edge and are attached to levers 239 which are clamped to sleeves 240 driven by gear 241 meshing with gears 242 on shaft 243. This shaft is driven through gears 244 by gears 245 on the shafts 232. The folders 238 are thus intergeared with the folders 228 and are driven in exact timed relation thereto, but with a differential movement which will presently be described.

The folders 228 are given a sidewise or broadside movement against the loaves by means of cams 246 fastened to sleeves 240 engaging with lugs 247 fastened to brackets 229. Springs 252 connecting arms 249 on brackets 231 and arms 251 on brackets 229 keep the lugs 247 in contact with the cams 246. Movement of the brackets 229 is limited by upright arms 253 contacting with adjustable set screws 254 on the arms 249. The gears 241, 242, 244 and 245 are so timed that the top folders make one revolution while the rear side folders 238 make two revolutions.

Just before coming into the range of action of the folders 228 and 238, the overhanging portions of the wrapper are lightly tucked on their top sides by the plates 255 (Figs. 1 and 5) on cross rods 256 depending from the frames 36 and 37. As the packages are continuously forwarded in one direction by the pushers 57, the top sides of the material overhanging the ends of the loaf come into the path of the downwardly moving folder 228, which then folds the top side of the material against the end of the loaf, and due to its broadside movement, presses the folded material tightly against the ends of the loaf. Since the folders 228 are driven at approximately the same speed as that of the loaf, they will follow alongside the loaf for a short interval. As the folders 228 approach their lowermost position (Fig. 20), the rear side folders 238 catch up with the folders 228 and pass them while the latter are pressed against the ends of the loaves, thus folding the rear side of the material over the folded top side.

Simultaneously with the folding of the rear side of the overhanging material, the leading or front sides of said overhanging material are folded by coming into engagement with the converging ends of the two stationary side folding plates 45 and 46 (Figs. 8 and 21). As will be seen from Figs. 8 and 22 to 26, the converging walls 259 of the stationary folders are provided with continuous folding surfaces extending inwardly along the path of the ends of the loaf to a position adjacent said ends, and thence downwardly below said ends, and then inwardly and upwardly adjacent said ends to fold the bottom side flap against the bottom of the loaf. Due to the eccentrcity of the driving and driven sprockets 223 and 234, the folders are driven most slowly during folding, picking up speed as they leave the loaf, and reducing speed as they approach it, this action being readily obtained by proper adjustment of the eccentric sprockets.

After the top sides and rear sides of the overhanging material are folded, the projecting flap formed of the bottom side of the overhanging material comes into engagement with the forward ends of the folding walls 45 and 46, and are guided along the folding surfaces thereof into the wax receptacle 221 which provides a pool of wax in the path of said bottom flap. The bottom side flap is next folded under towards the bottom and caught between the resilient guides 260 (Fig. 8), which keep the flap closely folded and pressed against the folding surfaces.

After the folding is completed, the loaf is pushed off the folding table 49 on to the plate 58 heated by heater 261. The plate 58 is provided with grooves which return surplus wax to the receptacle 221, or which may be filled with wax to supply sealing compound when unwaxed paper is used. At the end of plate 58 are provided heated sealing fingers 264 which complete the sealing of the bottom of the wrapper.

In order to disengage the wrapped loaves from the pushers without scraping or marring the waxed or other type of wrapper through lateral withdrawing movement of the pushers, the loaf is propelled on to a belt 62 driven at a greater speed than that of the pushers 57. This belt is driven by a gear 265 on the shaft 67, which gear meshes in turn with gear 266 on shaft 68 carrying the gear 268 in mesh with gear 269 on shaft 69. From this belt the loaves or other articles are delivered on to another delivery belt 63.

To hold the loaves lightly but firmly against the folding table 49 and the pushers 57, bars 180 are provided carrying cross bars 270, which adjustably support a bar 271. Tension bars 272, 273, 274 hinged to the side of the bar 271 press lightly on the tops of the loaves.

Suitable means are provided for driving the main drive and cam shaft 38, comprising a shaft 275 carrying the pulley 276 driven from a motor or countershaft by belt 277 and carrying a gear 278 meshing with gear 279 on the shaft 38. A suitable slip clutch 281 operates to automatically release the gears in case of a jam. Sprocket 281 on shaft 38 drives shaft 69 and from it belts 62 and 63 through chain 282 and sprocket 283.

In view of the foregoing detailed description of the operation of the machine is deemed unnecessary and, therefore, omitted in the interest of brevity.

What is claimed is:

1. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said forwarding mechanism operating to continuously forward the enfolded articles in one direction during the folding operations.

2. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, stationary means for folding the front sides of the overhanging material on the ends of the article and the lower sides on the bottom of the article, said forwarding mechanism including travelling pushers engaging said articles, a delivery conveyor onto which said articles are forwarded by said pushers, and means driving said conveyor at a greater speed than that of said pushers to disengage the articles from the pushers.

3. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said folders comprising blades mounted for relative movement on an axis above the folding position.

4. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said operating means including means for causing sidewise movement of the top side folders to press the folded material against the ends of the article.

5. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said operating means including means for producing differential movement of said folders to cause one folder to overtake the other folder while said folders are operating on said material.

6. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the articles, said operating means including folder driving mechanism for causing relatively slow movement of said folders during folding as compared with the remainder of their movement.

7. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said operating means including a chain drive having eccentric driving and driven sprockets.

8. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said operating means being timed to drive the top side folder during folding at approximately the same speed as that at which the article is forwarded.

9. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said operating means being timed to drive the top side folder during folding at approximately the same speed as that at which the article is forwarded and to drive the rear side folder at an accelerated speed with respect to that of the top side folder.

10. The combination with mechanism for folding a wrapper circumferentially about an article and overhanging the ends thereof, of mechanism for forwarding the enfolded articles, flying folder successively engaging the top and rear sides of the overhanging material to fold said sides on the ends of the article, operating means for said folders, and stationary means for folding the front sides of the overhanging material on the ends of the article and the lower sides on the bottom of the article, said forwarding mechanism operating to continuously forward the enfolded articles in one direction during the folding operations, said stationary folding means comprising walls each having converging folding surfaces extending inwardly to a position adjacent the end of the article, thence downwardly below said end and thence inwardly and upwardly to form a convex folding surface adjacent the bottom of the article.

11. The combination with mechanism for folding a wrapper circumferentially about an article and overhanging the ends thereof, of mechanism forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said forwarding mechanism operating to continuously forward the enfolded articles in one direction during the folding operations, said stationary folding means having a continuous folding surface extending along, down and thence inwardly and upwardly under the path of the article in the form of a convex surface to first fold the said front side against the end of the article and then fold the bottom side down, under and against the bottom of the article.

12. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, and stationary means for folding the front sides of the overhanging material on the ends of the article and the lower sides on the bottom of the article, said top side, rear side and stationary folders coacting respectively to hold the top side folded against the end, and to simultaneously fold the rear and front sides on said top side.

13. The combination with mechanism for folding a wrapper circumferentially about an article and overhanging the ends thereof, of mechanism for forwarding the enfolded articles, flying folders successively engaging the top and rear sides of the overhanging material to fold said sides on the ends of the article, operating means for said folders, stationary means for folding the front sides of the overhanging material on the ends of the article and the lower sides on the bottom of the article, and means for simultaneously adjusting said flying folders, operating means and stationary means to operate on articles of different size, said forwarding mechanism operating to continuously forward the enfolded articles in one direction during the folding operations.

14. Mechanism for folding material overhanging an end of partially wrapped articles, comprising a plurality of blades mounted for revolution in planes adjacent the end, operating means for causing combined revolving and broadside movement of one of said blades to fold a part of said material and hold it against said end and for revolving another of said blades past the former blade to fold another part of said material over the folded and held part.

15. Means for folding material overhanging the ends of partially wrapped travelling articles, comprising flying folders successively engaging the top and rear sides of the overhanging material to fold said sides on the ends of the article, stationary means along the path of said articles for folding the front sides of the overhanging material, and operating means for causing said top side and rear side folders respectively to hold the top sides folded against said ends and to fold the rear sides on said top side simultaneously with the folding of the front sides.

16. Means for folding material overhanging the end of partially wrapped travelling articles, comprising a stationary member having a continuous folding surface extending alongside the path of the article and inwardly to a position adjacent the end of the article to fold the front side of the overhanging material on the end of the article, thence downwardly below said end to fold the bottom side of the overhanging material down, and thence inwardly and upwardly to a position adjacent the bottom of the article to fold said bottom side against the bottom of the article, and resilient guide means for maintaining said bottom side against said surface.

17. Mechanism for folding material overhanging an end of partially wrapped articles comprising a folder blade mounted for revolution in a plane adjacent the end of the articles, operating devices for revolving the blade to fold a part of said material, and means for simultaneously causing broadside movement of said blade to press the folded part of the material against said end.

18. Mechanism for folding material overhanging an end of partially wrapped articles comprising a folder blade mounted for revolution in a plane adjacent the end of the articles, operating devices for revolving the blade to fold a part of said material, and means for simultaneously causing broadside movement of said blade to press the folded part of the material against said end, said means including a stationary cam and a device on said blade positioned to engage said cam.

19. Mechanism for folding material overhanging an end of partially wrapped articles comprising a folder blade mounted for revolution in a plane adjacent the end of the articles, operating devices for revolving the blade to fold a part of said material, and means for simultaneously causing broadside movement of said blade to press the folded part of the material against said end, said means including a stationary cam, a device on said blade engaging said cam and spring operating means for giving a limited movement to said blade away from said end.

20. Mechanism for folding material overhanging an end of partially wrapped articles comprising a folder blade mounted for revolution in a plane adjacent the end of the articles, operating devices for revolving the blade to fold a part of said material, means for simultaneously causing broadside movement of said blade to press the folded part of the material against said end, and means for continuously forwarding the articles during said folding and pressing at a speed approximately equal to that of the blade.

In testimony whereof, I have signed my name to this specification.

FRANK REINHOLD SCHMITT.